United States Patent [19]

Hogue

[11] Patent Number: 4,570,609

[45] Date of Patent: Feb. 18, 1986

[54] WATER-COOLED HUB FOR FLUSH-CUT CONCRETE SAWS

[76] Inventor: John J. Hogue, 11586 Monroe Way, Thornton, Colo. 80233

[21] Appl. No.: 658,362

[22] Filed: Oct. 5, 1984

[51] Int. Cl.[4] ............................................. B28D 1/04
[52] U.S. Cl. .................................... 125/13 R; 51/267
[58] Field of Search ................. 51/267; 125/13 R, 15, 125/12

[56] References Cited

U.S. PATENT DOCUMENTS

| | | | |
|---|---|---|---|
| 2,708,332 | 5/1955 | Riddell | 51/267 |
| 2,840,960 | 7/1958 | Booth | 51/267 |
| 3,896,783 | 7/1975 | Manning | 125/13 R |

FOREIGN PATENT DOCUMENTS 1215064  12/1970  United Kingdom .................. 51/267

*Primary Examiner*—Harold D. Whitehead
*Attorney, Agent, or Firm*—Edwin L. Spangler, Jr.

[57] ABSTRACT

This invention relates to an improved hub for diamond-edged concrete saws and, more particularly, to a hub or mandrel of the so-called "flush" type which mounts the saw blade such that the latter can make a cut while lying flush against a planar surface like, for example, a floor or wall. The hub is characterized by an rearwardly-opening donut-shaped annular groove bordering its hollow central core area which receives cooling water delivered thereto from a stationary source in the form of an inlet pipe and then disperses same centrifugally onto the remote surface of the blade mounted thereon by means of passages leading out of the groove and passing through the hub onto the aforementioned remote surface of the blade closely adjacent the central opening therein.

10 Claims, 2 Drawing Figures

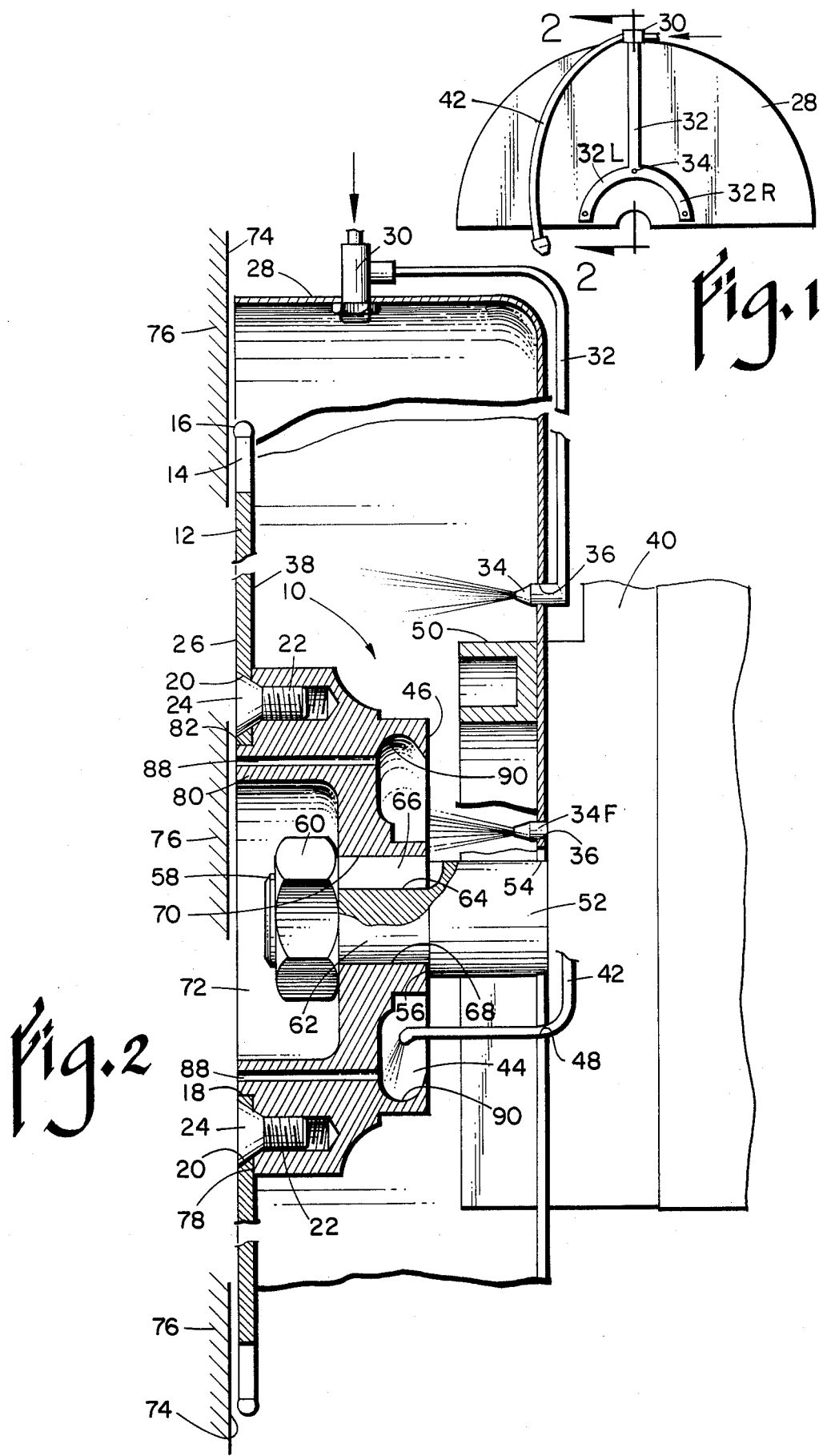

WATER-COOLED HUB FOR FLUSH-CUT CONCRETE SAWS

Circular saws have been made for many years that are capable of making a cut adjacent a planar surface like a wall, a floor or ceiling, however, such saws are made to cut wood and other relatively soft materials where air cooling of the blade is entirely adequate. There also exists in the prior art various types of liquid-cooled saws, grinding wheels, polishing wheels, boring tools and the like. In some applications, the coolant not only cools and lubricates the cutting edge but, in addition, holds down the dust and flushes away the cuttings.

Examples of water-cooled edge cutting tools are found in U.S. Pat. Nos. 2,546,805; 2,708,332; 2,722,792; 3,777,443; and, 4,414,783. The first four of the above-mentioned patents all related to wet grinding wheels where the edge rather than the face does the grinding and, for this reason, must be supplied with cooling water. The remaining patent in this group is designed to cut metalurgical samples rather than grind upon a workpiece but, nevertheless, the cooling system remains highly analogous. British Patent Specification No. 790,480 brings a unique approach to the problem of dust supression by using a wheel made from a porous material and then conducting the wetting agent to its periphery centrifugally through the pores and other interstices in the body thereof.

Of the prior U.S. patents known to applicant that deal specifically with water-cooled saws to cut concrete, attention is directed to Mr. Bieri's jig saw forming the subject matter of his U.S. Pat. No. 4,043,311 and the circular saw U.S. Pat. Nos. 3,282,263 and 3,896,783 issued to Christensen et al and Manning, respectively. The hub design of the latter two circular saws is such that, obviously, they cannot be used to make cuts flush up against a planar surface.

Surface grinding wheels like those forming the subject matter of the U.S. Pat. No. 2,840,960 to Booth and the German Pat. No. 707,628 are somewhat more relevant in that they are designed for working on flat surfaces with the axis of wheel rotation perpendicular rather than parallel to such surface. In general, wheels such as these are driven at relatively slow speeds and their purpose is one of dressing the surface, not cutting it. Thus, while water or some other liquid is used and, undoubtedly, has some effect as a coolant, it very likely has its primary function that of a dust supressant. Regardless of the function of the liquid, in each instance it is delivered only to the periphery of the wheel where the actual grinding operation is taking place.

By far the most pertinent prior art known to applicant is contained in British Patent Specification No. 1,215,064 wherein a diamond-edged cutting tool capable of making a flush cut is shown. Due to its construction, however, only the teeth at its outer peripheral edge contact the workpiece and, like the dressing wheels discussed above, the coolant is delivered to this cutting edge exclusively with none going to the center of the blade. The result of this is, of course, to confine the cooling action to the toothed area while ignoring other parts of the blade.

The saw blades for cutting concrete in common use today are, for the most part, flat circular steel ones somewhere between approximately 100/1000ths and 200/1000ths thick to which diamond particles and dust are adhesively-attached to form the tips located at spaced intervals along the periphery. These blades are rotated at much higher speeds than a grinding wheel and if they get too hot, the adhesive melts that has been used to attach the diamond tips to the blade edge causing the latter to fly off and become a dangerous projectile traveling at speeds approaching that of a rifle bullet. Directing a liquid coolant to the outer periphery of the blade generally provides an adequate solution to this problem as is self-evident from the prior art discussed above.

Another consequence of overheating is very appreciable shortening of blade life by as much as 75% to 80% which is by no means insignificant especially when one realizes the a set of three of these blades in the larger sizes runs just under $9,000 at current prices. Under normal conditions, a blade will only last long enough anyway to cut a slot about an inch or so deep and 3000 feet long.

There remains, however, yet another problem that is not solved by the prior art liquid blade cooling systems to a degree that enables such blades to be use for flush cuts like those shown in the Scholz et al British Specification referred to previously. It is not just the peripheral edges of these blades where the diamond-impregnated teeth are located that become the source of the problems but, most particularly, those areas right around the hub or mandrel to which the blade is attached. An appreciation of the magnitude of this problem requires, first of all, an understanding of just how these blades are made and what happens to them when the become overheated in use.

During the manufacturing process, the steel blades are pretreated before the diamond tips are added so that they become what is known as "tensioned". This tensioning process prestresses the blades such that they remain flat during use and run true. Unfortunately, if the area at the center of the blade becomes overheated, it will lose its tension and the internal stresses held in check by such tension will take over and cause it to distort, become wavy much like a potato chip and, as a result, bind up in the saw cut. Moreover, the load on the blade is greatest at its center where the mandrel is attached and, therefore, if this area of the blade gets hot, stress cracks begin to develop and it could, conceivably, break free with the attendant disasterous consequences.

Now, with the conventional hub or mandrel that attaches to the blade and projects on both sides of the mounting hole in the center, the area around the hub generally remains fairly cool since it is out of frictional contact with any surface of the workpiece. If, therefore the toothed edge is kept cool by wetting same with a suitable fluid, what little heat remains that can be conducted back to the center is insufficient to cause any warping or stress-cracking problems.

Quite unexpectedly, applicant has discovered that the foregoing is decidedly not the situation with a flush-mounted blade that is turning at high speed closely adjacent the planar surface along which the cut is being made. Instead, the area immediately around the hub becomes very hot, stress cracks begin to occur and with the tension thus relieved due to overheating, the blade becomes distorted and binds up. Furthermore, directing the coolant against the adjacent side of the blade remote from the wall, floor or other surface along which the cut is being sawed does not do the job and serious overheating is the result. This is true even though the coolant is delivered to the surface of the blade closely adjacent its center and not only at the edges thereof where the teeth are located as taught by the aforementioned prior art patents.

Applicant is unaware of any hub or mandrel that is capable of holding an essentially planar, steel, diamond-tipped circular saw blade in flush relation against a flat working surface that can be kept cool enough to prevent stress-cracking around the center hole and warping throughout. As a result, flush cuts through concrete are not presently being made, but instead, the conventional hubs and saw blades are used to make a saw cut an inch or so inside the adjacent wall or floor surface and, once the cut is complete, the excess material is chiseled away in some labor-intensive manner only to leave a rough unfinished surface. He has now discovered, however, that such cuts can in fact be made by the simple, yet unobvious, expedient of making the hub with a centrally-located recess in its front face, providing a rearwardly-opening generally donut-shaped annular groove in its rear face, supplying coolant to this groove from a stationary source located inside the hollow core, and whirling the liquid in the groove forwardly through passages inside the hub and outward centrifugally along the areas on its remote face bordering the center opening in the blade so as to drench the latter and keep it cool. The hub is marginally-flanged and provided with tapped holes to receive screw fasteners with their heads countersunk into the remote surface of the blade so as to remain flush therewith. When thus equipped and cooled, the normal blade life is restored, no warpage occurs nor does any stress-cracking around the center opening. Also, and most important, while the blade is running with it remote face in very close, if not actual physical contact with the adjacent planar workpiece surface, the resulting saw cut is clean, smooth and in the same plane as the adjacent wall or floor.

Accordingly, it is the principal object of the present invention to provide a novel and improved coolant-distribution hub for mounting planar, diamond-edged steel circular saw blades so that they can be used for making flush cuts along a flat working surface.

A second objective of the invention herein disclosed and claimed is the provision of hub of the type aforementioned which is equipped to receive coolant fluid from a source thereof and, at a minimum, direct same onto the surface of the saw lying in opposed face-to-face relation to the flat workpiece surface in the area of the center opening in said saw.

Another object of the within-described invention is one of providing a hub or mandrel for the flush-mounting of flat steel circular saw blades which includes a coolant distribution system so effective that stress-cracking around the center opening and warping is virtually eliminated.

Still another objective is that of providing a hub with the aforementioned flush-mounting capability that maintains its ability to keep the adhesively-attached diamond-impregnated teeth at the edge thereof cool and in place under the severest of working conditions.

An additional object is to provide a hub which can be used to mount conventional diamond-edged flat steel circular saw blades for flush-cutting operations with but minor and inexpensive modifications to the latter consisting primarily of countersinking the holes around the center opening that receive the mounting bolts.

Further objects are to provide a hub of the class described which is simple, relatively inexpensive to make, versatile, rugged, reliable, safe and even somewhat decorative.

Other objects will be in part apparent and in part pointed out specifically hereinafter in connection with the drawings that follows, and in which:

FIG. 1 is an elevational view showing the fluid distribution system associated with the blade guard and the gear housing that is employed to simultaneously spray water as a coolant onto both the near and the remote blade surfaces at points closely adjacent its axis of rotation; and, FIG. 2 is a greatly enlarged diametrical section taken along line 2—2 of FIG. 1 showing the unique hub design which picks up the coolant and delivers same to the remote face of the blade even while the latter lies flush up against a working surface, portions having been broken away to conserve space while others have been similarly treated to more clearly reveal the interior construction.

Referring next to the drawings for a detailed description of the present invention, reference numeral 10 has been chosen to broadly designate the improved hub which is used to mount the circular saw blade 12 in flush relation to a working surface such that it can make a cut in parallel alignment therewith. The blade is circular and planar in accordance with conventional design. It has a plurality of teeth 14 spaced around its periphery that are covered and coated with an adhesively-attached abrasive material, usually diamond dust or particles thereof 16. It also has a large center opening 18 and a plurality of countersunk bolt holes 20 arranged in angularly-spaced relation around the outside of the latter for attaching it to the hub. As far as modifications to the conventional diamond-tipped saw blade are concerned, they consist mainly of providing it with these countersunk bolt holes such that the mounting bolts 22 with their frusto-conical heads 24 can be recessed and thus lie flush with its remote face 26 as shown.

Concrete saws, even the small diameter ones, must be cooled by spraying them with a coolant liquid, usually water. The large diameter blades, i.e. those capable of making cuts over about 12 inches deep, require special cooling in the area of the center opening where the previously-mentioned stress cracking can occur with blade failure being the result. Also, as already noted, if they get too hot, warpage takes place due to the fact that the heat causes them to lose the tension built in when they were manufactured for the purpose of getting them to run true. Now, in the case of the usual situation where both the near and remote faces of the blade are readily accessible, it becomes a simple matter to direct sprays of a coolant liquid thereagainst issuing from stationary nozzles attached to the blade guard or other suitable supporting structure. Such a coolant distribution system has been illustrated in FIG. 1 to which brief reference will next be made.

The blade guard or housing 28 covers all but the working area of the blade which, in the particular attitude of the guard shown, would project therebeneath. In the top of this guard has been shown a manifold 30 the inlet of which is connectable to a supply of coolant under pressure, customarily nothing more than a garden hose. Pipe 32 takes water from the outlet of the manifold along the outside of the guard to a first nozzle 34 fastened within a suitable aperture 36 provided for this purpose and located to spray the coolant onto the near face 38 of the blade closely adjacent the area where it emerges from behind the hub 10 as seen in FIG. 2. In the specific form illustrated, a pair of branch coolant lines 32L and 32R take water from line 32 and deliver it to left and right auxiliary nozzles 34F and 34R, respectively, positioned alongside the gear housing 40. All of the coolant distribution system just described is conventional and forms no part of the present invention. In other than flush-mounted blade assemblies, it would also include provision for spraying water onto the remote face 26 of the blade which, of course, would be readily accessible. This is not the case, however, with the instant flush-mounted blade because there is no room left for the lines and nozzles needed to get water onto its remote face.

The novel aspects of the present invention have to do with the cooling of the remote 26 of the blade, not the near face 38. For this purpose, a branch line 42 seen in FIG. 2 takes water from manifold 30 and delivers it to an annular groove 44 located in the rear end 46 of hub 10. In the particular form illustrated, pipe 42 passes into the blade guard 28 through an opening 48 in its sidewall. Gear housing 40 is a part of the drive mechanism for the saw as is the case with generally U-shaped casting 50, only the latter having been illustrated in any detail. These housing elements are fastened together with bolts (not shown) that secure the blade guard in position between the two as illustrated and their only significance insofar as the present invention is concerned is that they provide convenient means for getting water into the annular groove 44 in the hub at a point relatively close to its axis of rotation. In other words these elements 40 and 50 are castings with lots of room inside through which the coolant line 42 can pass without adversely affecting the operation of the saw. Obviously, the line 42 could be rerouted through the blade guard in such a way that it would not have to pass through either of these conventional saw parts.

Output shaft 52 enters the blade guard through opening 54 in the latter within which it turns freely. Shaft 52 is of the stepped type having a forwardly-facing annular shoulder 56 against which the rear face 46 of the hub abuts as shown. Shaft 52 terminates at its forward end in a threaded section 58 onto which nut 60 is screwed to hold the hub in place. Located between threaded section 58 and the shoulder 56 is a section of reduced diameter 62 that is grooved as indicated at 64 to receive a spline 66. The central opening 68 in hub 10 is similarly grooved as shown at 70 to receive spline 66. Thus, shaft 52 and hub 10 turn relative to the blade guard 28 and the drive subassembly elements 40 and 50 previously alluded to. More significant, however, from the standpoint of the present invention is the fact that the annular groove 44 in the hub turns relative to the coolant fluid line 42 that delivers water thereto.

The front end of hub 10 is deeply recessed as shown at 72 to define a pocket housing the threaded end of the shaft and the nut 60 screwed on the latter so that neither projects onto the remote face 26 of the saw blade which face must be left free to ride along the opposed surface 74 of the work indicated somewhat diagrammatically at 76 in face-to-face flush relation. The forwardly-facing blade-receiving surface 78 of the hub is recessed the thickness of the blade 14 as shown. Bordering the aforementioned recessed blade-receiving surface is an exposed medial portion 80 which is encircled by an annular shoulder 82 adapted to fit into the central opening 18 in the blade and maintain it in centered relation.

Finally, and of utmost functional significance are the passages 88 through the hub that connect the annular groove 44 therein with the front face of the latter closely adjacent the axis of blade rotation. As seen in FIG. 2, the outer periphery of the annular groove 44 is deeply concave as identified by reference numeral 90 so as to define a pocket into which the coolant liquid will be whirled centrifugally as the blade and hub are rotated at high speed. The liquid in this concave annular pocket will, in turn, be forced centrifugally through the passages 88 communicating with the latter and out onto the front face of the hub right at the point where the blade attaches thereto and where the stress cracking is going to take place if this area is not kept cool. Centrifugal force will, of course, take care of moving the fluid issuing from passages 88 onto that area of the blade immediately adjacent the center opening 18 therein. Also, and most significant to the successful operation of this blade cooling system is the cooperative action of the adjacent working surface 74 which keeps the coolant trapped and in place up against the remote face 26 of the blade where it remains effective because, otherwise, much of the fluid would fly away and escape before it could do any good. After cooling the area around the hub, the fluid quickly migrates out to the periphery of the blade where it does the customary job of cooling the teeth 14. By trapping the fluid between the remote face of the blade and the opposed face 74 of the work, it becomes possible to even make a horizontal cut through a wall along a floor without the fluid issuing from passages 88 gravitating away and doing no good as a coolant. Stress-cracking around the center opening and warping of the blade do to the heat-induced release of its internal tension is thus avoided while, at the same time, effectively cooling same to maintain its expected working life.

What is claimed is:

1. For use in combination with a thin planar high speed diamond-edged circular concrete saw blade, the hub for both mounting same and for distributing coolant to the remote face thereof which comprises: a shallow generally cup-shaped member having a forwardly-facing blade-receiving surface bordering a central depression therein, said blade-receiving surface being sized and adapted to border a central opening in the saw blade and receive fasteners entering from the remote face thereof attaching the near face of said blade thereto for rotation in flush face-to-face essentially contacting relation to a planar surface located in opposed relation to said remote face, said member also having a rearwardly-facing surface with an axial bore therethrough for receiving a drive shaft opening into the depression and an annular groove bordering said axial opening, said annular groove being shaped on the outside periphery thereof to define an annular pocket adapted to receive fluid delivered thereto and retain same under the influence of centrifugal forces acting thereagainst when said member is rotated at high speed, said depression being of a depth adapted to house the end of the drive shaft emerging therein and house same along with the means connecting said shaft and member together in recessed relation to the forwardly-facing blade-receiving surface, and a plurality of passages connecting the fluid-retaining pocket in the periphery of the groove to an exposed medial portion of said member positioned between the forwardly-facing blade-receiving surface thereof and the central depression therein that borders the central opening in the blade and does not project beyond its remote face, said passages being so sized and arranged as to conduct fluid from the annular pocket under the influence of the aforesaid centrifugal forces and distribute same onto said remote blade face adjacent its central opening.

2. The hub as set forth in claim 1 in which: the forwardly-facing blade-receiving surface is planar.

3. The hub as set forth in claim 1 in which: the medial portion comprises a ledge projecting forwardly of the forwardly-facing blade-receiving surface a distance approximating the thickness of the blade, said medial portion and forwardly-facing blade receiving surface are separated from one another by a shoulder, and in which said shoulder is of a size and shape to fit into the central opening in the blade and maintain same centered with respect to its axis of rotation.

4. The hub as set forth in claim 1 in which: the passages have an inlet and an outlet, and in which said inlet opens into the annular groove at a level below the upper edge of the concavity therein when a particular passage occupies its lowermost position and the axis of blade rotation is horizontal.

5. The hub as set forth in claim 1 in which: the annular groove together with the concave periphery of the latter cooperate to define a generally donut-shaped cavity.

6. The hub as set forth in claim 1 in which: at least three passages are arranged in substantially equiangularly-spaced relation around the axis of blade rotation.

7. The hub as set forth in claim 3 in which: the medial portion is substantially planar and coplanar with the remote face of the blade when said blade and hub are in assembled relation.

8. The hub as set forth in claim 4 in which: the passages lie in substantially parallel relation to one another and to the axis of rotation.

9. The hub as set forth in claim 4 in which: the inlet and outlet of each passage are so oriented with respect to one another that fluid contained in the annular groove will gravitate from the former to the latter when said passage occupies the aforesaid lowermost position.

10. The hub as set forth in claim 5 in which: the donut-shaped cavity is endless.

* * * * *